C. C. LANE.
Can for Hermetically-Sealed Goods.

No. 221,325.   Patented Nov. 4, 1879.

Witnesses
Frank A. Brooks
Geo. N. Strong

Inventor
Charles C. Lane
By Dewey & Co.
Attys

UNITED STATES PATENT OFFICE.

CHARLES C. LANE, OF NEW WESTMINSTER, BRITISH COLUMBIA.

IMPROVEMENT IN CANS FOR HERMETICALLY-SEALED GOODS.

Specification forming part of Letters Patent No. 221,325, dated November 4, 1879; application filed June 2, 1879.

*To all whom it may concern:*

Be it known that I, CHARLES C. LANE, of New Westminster, British Columbia, have invented a Can for Hermetically-Sealed Goods; and I hereby declare the following to be a full, clear, and exact description thereof.

My invention relates to an improvement in that class of cans intended for hermetically-sealed goods, and refers more particularly to a can in which fish or other packages of an irregular shape or form can be hermetically sealed or canned in the natural shape.

My improvements will be more particularly described by reference to the accompanying drawings, in which—

Figure 1:
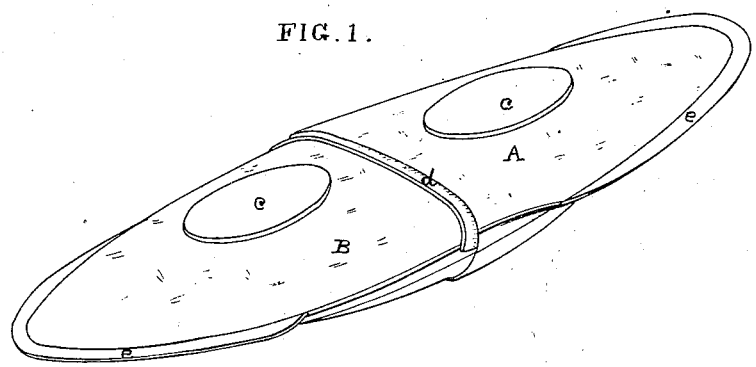
Figure 2:
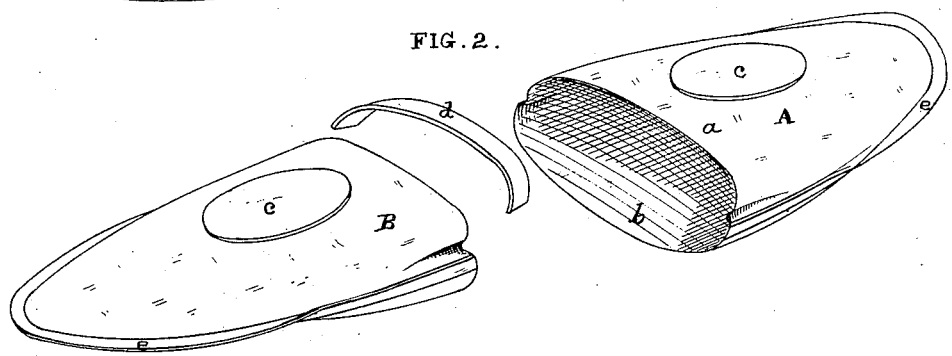
Figure 3:
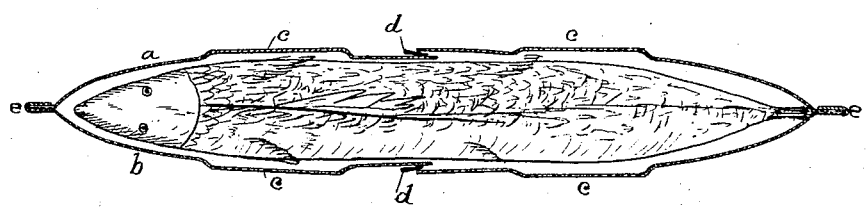

Figure 1 is a perspective view of my invention. Fig. 2 shows the parts separate. Fig. 3 is a longitudinal section.

The ordinary form of cans in which salmon and other fish are hermetically sealed necessitates the cutting of the fish into pieces of small size, and its appearance when prepared for the table is not satisfactory. To obviate this, large fish-shaped cans have been made by stamping out two pieces of tin, each forming the entire length of the fish. Besides necessitating the use of a large and expensive size of tin, which will cut to waste a great deal, these cans can never be finished until the fish has been placed in them, and a longitudinal seam of double the length of the fish must be soldered by hand, as the mechanical bath cannot be depended upon to make a tight joint without blow-holes after such a can has been filled. Besides this each can must fit its fish closely enough to prevent movement to preserve the fish, and no adjustment being possible, the time taken to select cans to fit fish renders this method too slow, costly, and impracticable.

My improvement consists in the formation of a can in two parts, the parts, respectively, being approximately of the shape of the head and tail half of a fish divided transversely to its length, and this two-part can is so fitted that it may be adjusted longitudinally to fit the length of the fish.

By the construction herein described I am enabled to form a fish-shaped can from sheets of metal of ordinary size without undue waste and by reason of the adjustability of the parts, I can manufacture the halves in quantity, and by the aid of the mechanical bath, so as to have the requisite number of cans on hand when the canning season commences, and from the peculiar construction of the can, the amount of soldering to be done when the fish is placed in the can is reduced to a minimum.

The can is made in two parts, A B, one part, B, being somewhat smaller than the other at the open end, so that it will fit into the other. Each of these parts is made in two pieces, the pieces being stamped out of sheet metal and soldered at the joints or meeting longitudinal edges *e*. These halves of the ends have each stamped in them a recess or flattened portion, *c*, which admit of a certain expansion during the boiling process and of contraction when the air is blown off, and the can and contents are finally cooled. This flattened portion or recess formed in these pieces makes a flat place on the outside, as shown in Fig. 3, and facilitates packing of the cans or storing on the shelves of the dealers in good order. When lying on either side the can rests on these flat parts, and they may be placed one above another without sliding about on account of the irregularity of their general shape.

Each can is formed of four pieces, two of which are stamped out to be approximately of the form of the head and shoulders of a fish, while the other two are shaped to fit the tail half of the fish. These are got out in quantities, and the two halves of each part are united, and the longitudinal seam is soldered by the aid of the mechanical bath, which is easily accomplished when the can is empty. This enables me to do the largest portion of the work of can-making, including the long side seam or joint, mechanically, with but little hard labor, and during the idle season and before the fish commence running.

When the two halves are thus made ready to receive the fish it will be seen that the surrounding transverse joint is all that is left to be done, and this renders the labor to be performed in the actual canning so slight that the fish may be put up in this manner to compete with any other form of canning.

After the separate ends are made in the manner described the fish is placed in the open end of one in the proper position, and the other half is placed over the other end of the fish.

The two open ends thus come together, the smaller slipping inside the larger. At this central joint I place a V-shaped piece or strip, *d*, of a soldering metal, which fits between the two parts to form the transverse joint in the final soldering, both by filling it up and by partially melting.

As the fish vary somewhat in size, it will be seen that the parts A and B must be telescoped or pushed together until they fit the fish snugly before the transverse or central joint is soldered. This will insure a perfect fit to every fish, and will prevent it from sliding about in the can.

By making the can in this manner small sheets of tin may be used with very little waste in cutting, and at the same time cans can be made which will correspond to the size and shape of the fish. It will be manifest that either of the halves may be sealed up independent of the other by simply fitting a flat head or cover to the large open end and soldering it in place after the can is filled.

Having thus described my invention, what I claim as new, and desire to secure by Letters Patent, is—

1. The fish-shaped can composed of the parts A B, said parts being each formed of two separate pieces joined longitudinally, the part B being made somewhat smaller than the other, so as to slip inside of it and adapt the can to the size of the fish, substantially as herein described.

2. The fish-shaped can composed of the parts A B, formed of the pieces *a b*, said pieces each having a flat depression or recess, *c*, to admit of expansion and contraction during boiling and facilitate packing or storing, substantially as and for the purpose herein described.

3. The can composed of the parts A B, formed as herein described, made adjustable one within the other, in combination with the wedge-shaped soldering-strip *d*, whereby the joint may be formed between the two at any point, substantially as herein described.

In witness whereof I have hereunto set my hand and seal.

CHARLES C. LANE. [L. S.]

Witnesses:
W. B. McKENZIE,
GEORGE COWAN.